(12) United States Patent
Lin et al.

(10) Patent No.: US 6,272,143 B1
(45) Date of Patent: Aug. 7, 2001

(54) QUASI-PUSHOUT METHOD ASSOCIATED WITH UPPER-LAYER PACKET DISCARDING CONTROL FOR PACKET COMMUNICATION SYSTEMS WITH SHARED BUFFER MEMORY

(75) Inventors: Yu-Sheng Lin; C. Bernard Shung, both of Hsinchu (TW)

(73) Assignee: Accton Technology Corporation, Hsinchu (TW)

( * ) Notice: Subject to any disclaimer, the term of this patent is extended or adjusted under 35 U.S.C. 154(b) by 0 days.

(21) Appl. No.: 09/126,608

(22) Filed: Jul. 31, 1998

(30) Foreign Application Priority Data

Mar. 20, 1998 (TW) .................................. 87104148

(51) Int. Cl.[7] .................................. H04L 12/56
(52) U.S. Cl. ................................ 370/412; 370/414
(58) Field of Search ................... 370/412, 414, 370/229, 413

(56) References Cited

U.S. PATENT DOCUMENTS

| 5,475,682 | * | 12/1995 | Choudhury et al. | 370/412 |
| 5,521,916 | | 5/1996 | Choudhury et al. | . |
| 5,561,663 | | 10/1996 | Klausmeier . | |

FOREIGN PATENT DOCUMENTS

0715436 * 6/1996 (EP) ..................................... 370/229

OTHER PUBLICATIONS

Y. Lin et al, Quasi–Pushout Cell Discarding, Sep. 5, 1997, IEEE Communications Letters vol. 1, No. 5., pp. 146–148.

J.F. Meyer et al, Dimensioning of an ATM Switch with Shared Buffer and Threshold Priority, 1993, pp. 96–108.

A. Choudhury et al, Dynamic Queue Length Thresholds in a Shared Memory ATM Switch, 1996 IEEE, pp. 679, 687.

I. Cidon, Optimal Buffer Sharing, Sep. 7, 1995, IEEE Journal, vol. 13, No. 7, pp. 1229–1240.

L. Tassiulas, Optimal Buffer Control During Congestion in an ATM Network Node, IEE/ACM Transactions on Networking, vol. 2, No. 4, Aug. 4, 1994, pp. 374–386.

* cited by examiner

Primary Examiner—Salvatore Cangialosi
(74) Attorney, Agent, or Firm—Sughrue, Mion, Zinn, Macpeak & Seas, PLLC

(57) ABSTRACT

The present invention provides a method and a system of packet communication queuing and selective pushout. In the packet communication module, the quasi-longest-queue pointer is set up to point to the quasi-longest queue within the shared buffer to implement selective pushout. When an in-coming packet enters its destination queue, or an out-going packets leaves one of the output queues, the quasi-longest-queue pointer is maintained by comparing the length of the quasi-longest queue and that of the destination or output queue, respectively. The longer one of the current quasi-longest queue and the length-varied queue becomes the new quasi-longest queue. In addition, a flag and a pointer are used to indicate the presence of a damaged upper-layer packet and the queue the damaged packet belongs to, respectively When the shared buffer is full and packet discarding is to be performed, the packet to be discarded is first selected from the queue storing the damaged upper-layer packet, and then, the quasi-longest queue. The present invention implements the selective pushout packet discarding discipline with significantly reduced number of queue length comparisons, and employs the upper-layer packet discarding control to achieve better upper layer packet loss performance.

15 Claims, 5 Drawing Sheets

QUASI-PUSHOUT METHOD ASSOCIATED WITH UPPER-LAYER PACKET DISCARDING CONTROL FOR PACKET COMMUNICATION SYSTEMS WITH SHARED BUFFER MEMORY

FIELD OF THE INVENTION

The present invention relates to packet communication systems. In particular, the present invention is directed to the method and system for selective pushout in packet communication queuing modules with shared buffer. More particularly, the present invention relates to the method and system for selective pushout with upper-layer discarding control in packet communication queuing modules with shared buffer.

RELATED PRIOR ART

In the field of packet communication networks, packet processing systems such as switches and multiplexers for ATM and Ethernet are usually implemented in the shared-buffer memory-based architecture. In such an architecture, incoming packets from all input ports to different output ports are buffered in logical output queues within the same shared buffer. As the size of the shared buffer is bounded in practical implementation, a packet processing system always needs a method to decide which packets should be discarded in buffer-full situations. This is usually referred to as the packet discarding control method. A good packet discarding control method should be fair and efficient, i.e., the shared buffer should be fairly used by all output queues, and the discarded packets should be selected to have the least impact on system performance.

Most shared buffer packet communication systems employ the threshold-based method as packet discarding control, such as those mentioned in "Dimensioning of an ATM switch with shared buffer and threshold priority," Computer Networks and ISDN systems, no. 26, pp. 95–108, 1993 and "Dynamic queue length threshold in a shared memory ATM switch," in Proc. Of INFOCOM, 1996, pp. 679–687. Such approach inhibits the buffering of incoming packets when the buffer usage reaches certain threshold level. This can be easily implemented with a usage counter and a comparator, but it provides a sub-optimum performance due to space-non-conserving, i.e., packet discarding occurs before the buffer is full.

Selective pushout (referred as "Pushout" hereafter) packet discarding control was found to achieve fair buffer utilization and optimal packet loss performance for the shared-buffer switching systems (see I. Cidon, et. al. "Optimal buffer sharing," IEEE Journal on selected areas in communications, vol. 13, no. 7, pp. 1229–1239, September 1995 and L. Tassiulas, et. al. "Optimal buffer control during congestion in an ATM network node," IEEE/ACM Trans. On Networking, vol. 2, no. 4, pp. 374–386, August 1994). The basic concept of Pushout packet discarding is to discard packet from the head of the longest queue to accommodate the incoming packet. This helps balancing the buffer occupancy of all queues, and also reducing the average delay by replacing an "old" packet with a "young" one. In spite of its optimum performance, Pushout is very difficult to implement because it must sort out the longest of all queues in the shared buffer on every packet arrival events. When the number of queues is large and the arrival of packets is frequent, the sorting operation may become the bottleneck for practical implementation.

Most communication protocols are layered, i.e., an upper-layer packet is segmented into several small lower-layer packets. For each upper-layer packet, if one or more lower-layer packets of it have been discarded, its integrity is damaged and the whole upper-layer packet should be retransmitted. Therefore, if a to-be-discarded lower-layer packet is selected from a damaged upper-layer packet, the upper-layer packet loss performance will not be affected. Such discarding control associated with the status of upper-layer packets shall reduce the damage to upper-layer packets and thus provide better upper-layer packet loss performance.

Therefore, it is necessary to provide a better implementation of Pushout packet discarding method. Besides, the upper-layer packets status should also be considered to achieve better upper-layer packet loss performance.

SUMMARY OF THE INVENTION

The main objective of this invention is to provide a packet discarding control method for packet communication systems with shared buffer. The packet communication system has a pointer (Qmax) to indicate the quasi-longest queue in the shared buffer and a corresponding queue length counter (QL[Qmax]) thereof. The pointer Qmax is updated on every packet arrival and/or departure events. If the length of the destination queue of an arriving packet grows longer than QL[Qmax] after the arrival, Qmax is updated to point to this new quasi-longest queue. Similarly, if the length of the output queue of a departing packet is found longer than QL[Qmax] after the departure, Qmax is updated to point to this new quasi-longest queue. As the quasi-longest queue. pointer Qmax is updated on every packet arrival and/or departure events (queue length change events), it tracks the real longest queue closely.

In one embodiment of the present invention, when the shared buffer is full and there are packets arriving at the inputs of the system, some packets must be discarded to make space for the arriving ones. The to-be-discarded packet is selected from the head of the quasi-longest queue. Since the quasi-longest queue pointer tracks the real longest queue closely, quasi-pushout (QPO) is able to provide the fairness and efficiency of the conventional Pushout packet discarding control method. It is also suitable for practical implementation because the update of the quasi-longest queue pointer, Qmax, involves only one comparison between two queue length counters, instead of sorting out the maximum among all queue length counters.

In addition, a damage flag and a damaged-queue pointer can be employed to identify the presence of a damaged upper-layer packet and to point to the queue which stores the damaged upper-layer packet respectively. And in another embodiment of the present invention, when the shared buffer is full and an incoming packet arriving at the input of the system, the packet to be discarded to make space for the arriving one is first selected from the damaged upper-layer packet, and then, from the head of the quasi-longest queue. The associated upper-layer packet status control will improve the upper-layer packet loss performance by accumulating discarded lower-layer packets in damaged upper-layer packets.

The present invention will be easily understood by referring to the following embodiments and attached drawings.

DESCRIPTION OF NUMERICAL REFERENCES

Figure 1:
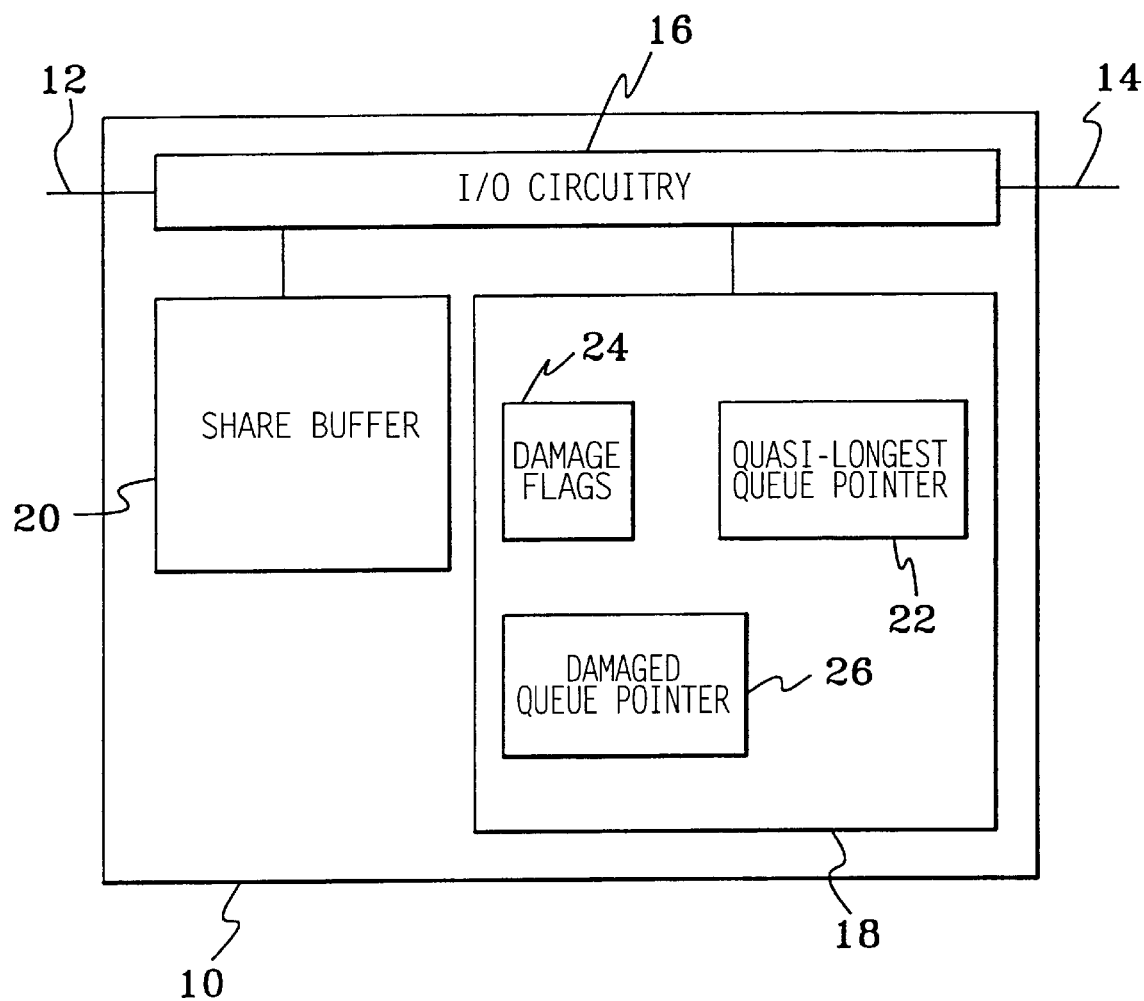
FIG. 1 illustrates a packet communication module.

10 Packet communication module
12 Input port
14 Output port
16 I/O circuitry
18 Processor
20 Buffer memory
22 Quasi-longest queue pointer
24 Damage flag
26 Damaged-queue pointer

DETAILED DESCRIPTION OF PREFERRED EMBODIMENT

In a packet communication system, "packet" refers to a unit of data segment encapsulated with identification information. The size of packets in a specific system may be fixed (e.g. ATM) or variable within a range (e.g. Ethernet).

The described embodiment is a fixed-size packet switch with multi-input and multi-output ports, for example, an ATM switch. In different embodiments, the present invention can be applied for multi-input/single-output system, such as a multiplexer, or single-input/multi-output system, such as a demultiplexer. The present invention can also be applied in other embodiments with fixed or variable length packets.

Referring to FIG. 1, the packet communication module 10 is connected to single or multiple input ports 12, from which the module 10 receives packets. The packet communication module 10 is also connected to a single or multiple output ports 14 for transmitting switched packets. Input ports 12 and output ports 14 are connected to the input/output circuitry 16 coupled to the processor 18 and the shared buffer memory 20.

If the packet communication system 10 is an embodiment of ATM switch, the input/output circuitry 16 may consist the phase-alignment circuitry and the serial-parallel converters. For packets received in input ports 12, their encapsulated identification information is forwarded to and processed by the processor 18. The shared buffer memory 20 serves as the storage for packet data.

The processor 18 contains the quasi-longest-queue pointer 22 which points to one of the queues in memory 20. This quasi-longest queue is possibly, but not necessarily, the longest queue in the shared buffer memory 20. In case the quasi-longest queue is not the real longest one, its queue length will be still quite close to the real longest one.

Figure 2:
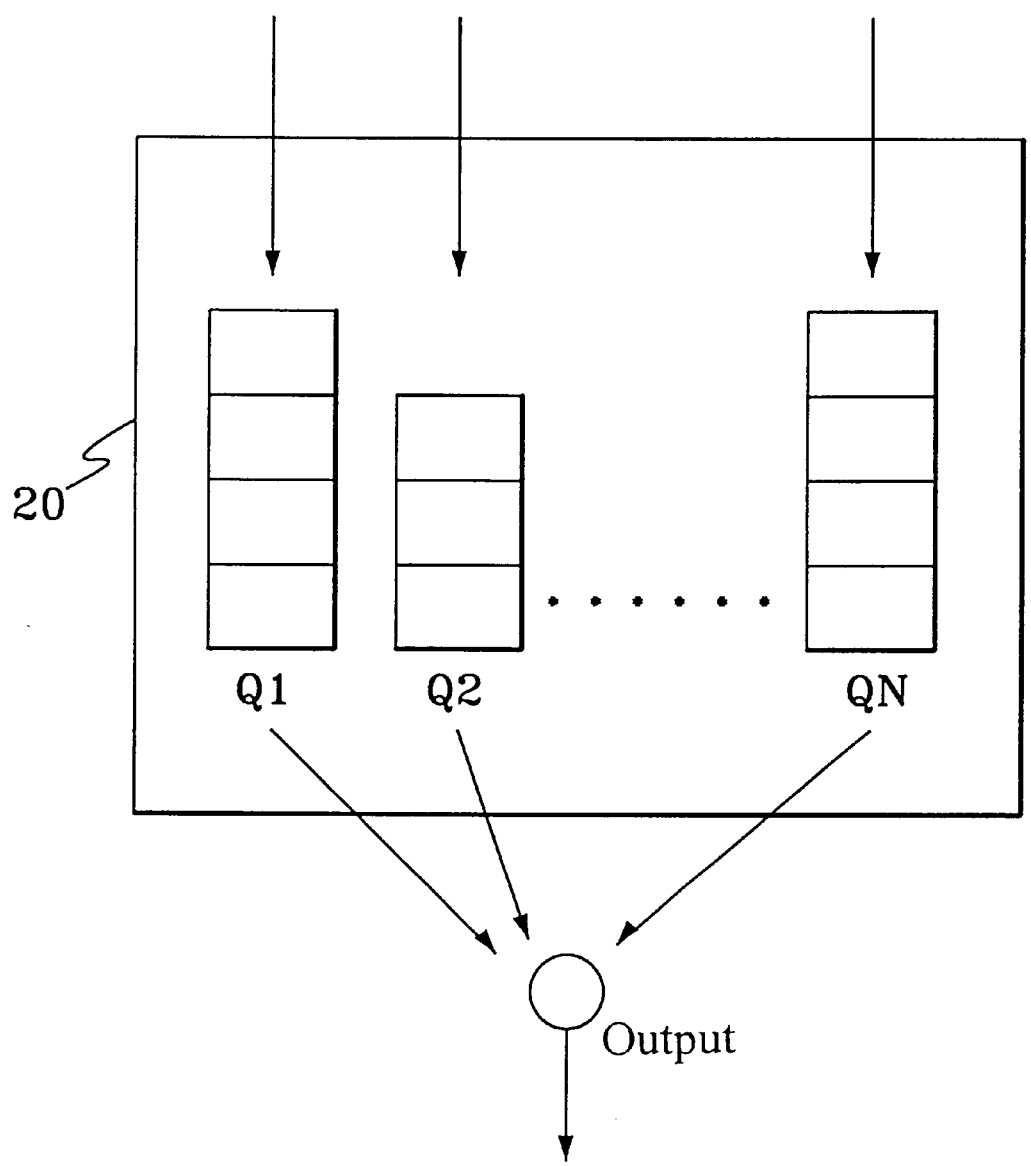
FIG. 2 is a logic diagram of a shared buffer in a packet communication module.

The quasi-longest queue pointer 22 is updated whenever a packet is buffered into or retrieved from the shared buffer memory 20. FIG. 2 shows the logic diagram of the queues in the shared buffer memory 20. However, the realization may differ from this diagram. There are N queues (from Q1 to QN) in the shared buffer memory 20. Each queue, if not empty, consists of one or more packets organized as a First-In-First-Out (FIFO) data structure. After a packet entering its destination queue, which may be any one of the queues in the shared buffer memory 20, the length of that queue is increased. By comparing the varied length of the destination queue and the length of the quasi-longest queue, the quasi-longest-queue pointer 22 is updated to point to the longer one. Similarly, after a packet being transmitted from one of the queues in the shared buffer memory 20, a comparison is performed to update the quasi-longest-queue pointer 22 to point to the longer one of the quasi-longest queue and the served queue. Whenever there is a queue length change. the quasi-longest-queue pointer 22 is updated to point to the longer one.

The content of the damage flag 24 represents whether a damaged upper-layer packet exists in one of the queues in the shared buffer memory 20. That is, if the damage flag is set to "1", part of an upper-layer packet has been damaged due to lower-layer packet discarding, and parts of the damaged upper-layer packet are still buffered in the shared buffer memory 20. The queue storing the remained part of a damaged upper-layer packet is indicated by the damaged-queue pointer 26.

When the shared buffer memory 20 becomes full, newly arrived packets will push out older packets based on the following decision process. First, the damage flag 24 is examined. If the damage flag is "0", which indicates no damaged upper-layer packet, the packet at the head of the quasi-longest queue is selected to be discarded. If the damaged flag is "1", which indicates a damaged upper-layer packets in the shared buffer memory, the to-be-discarded packet is selected from the damaged upper-layer packet, i.e., from the head of the queue pointed by the damaged-queue pointer 26.

Figure 3A:
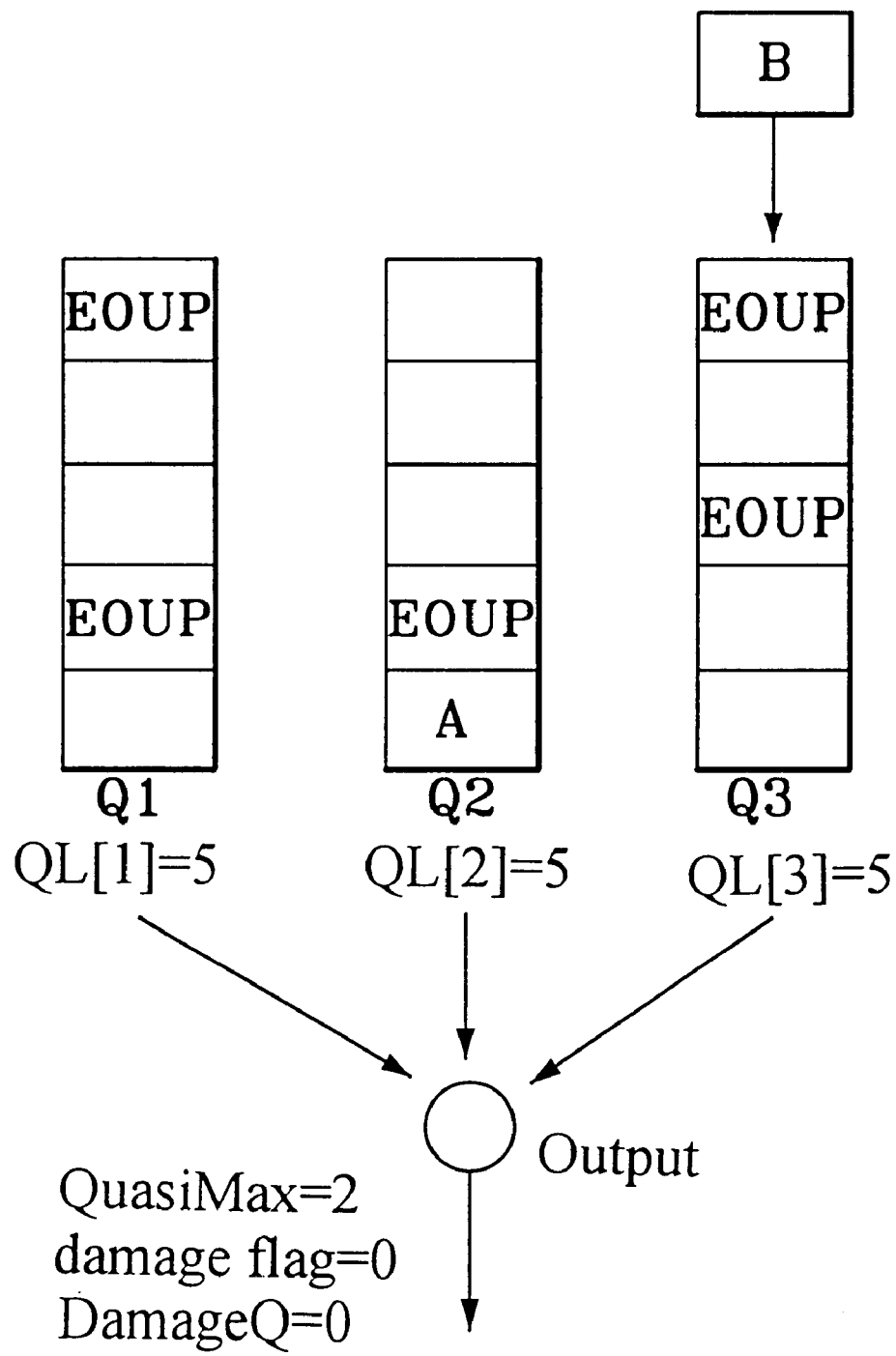
FIG. 3a to 3c illustrates the process of quasi-pushout associated with upper-layer packet discarding control.

FIG. 3 shows the process of packet discarding and the status change of queues in the shared buffer memory 20. In FIG. 3a, each queue has five buffered packets, thus the queue length QL[1], QL[2], and QL[3] are all equal to 5. The end packet of an upper-layer packet is labeled as EOUP. Assume that the quasi-longest-queue pointer 22 is set to Q2, i.e., QuasiMax=2, and that all the upper-layer packets are not damaged, thus the damage flag 24 and the damaged-queue pointer 26 are both reset to zero, i.e., damage flag=0, and DamageQ=0.

When the packet B enters Q3 and the buffer space is used up, the discarding process is initiated. Based on the contents of the damage flag 24, there is no damaged upper-layer packet. Thus, the head packet A is discarded from the head of the quasi-longest queue Q2. After that, packet B is stored into the buffer, and the contents of QuasiMax, damage flag, and DamageQ are updated to the status in FIG. 3b.

Figure 3B:
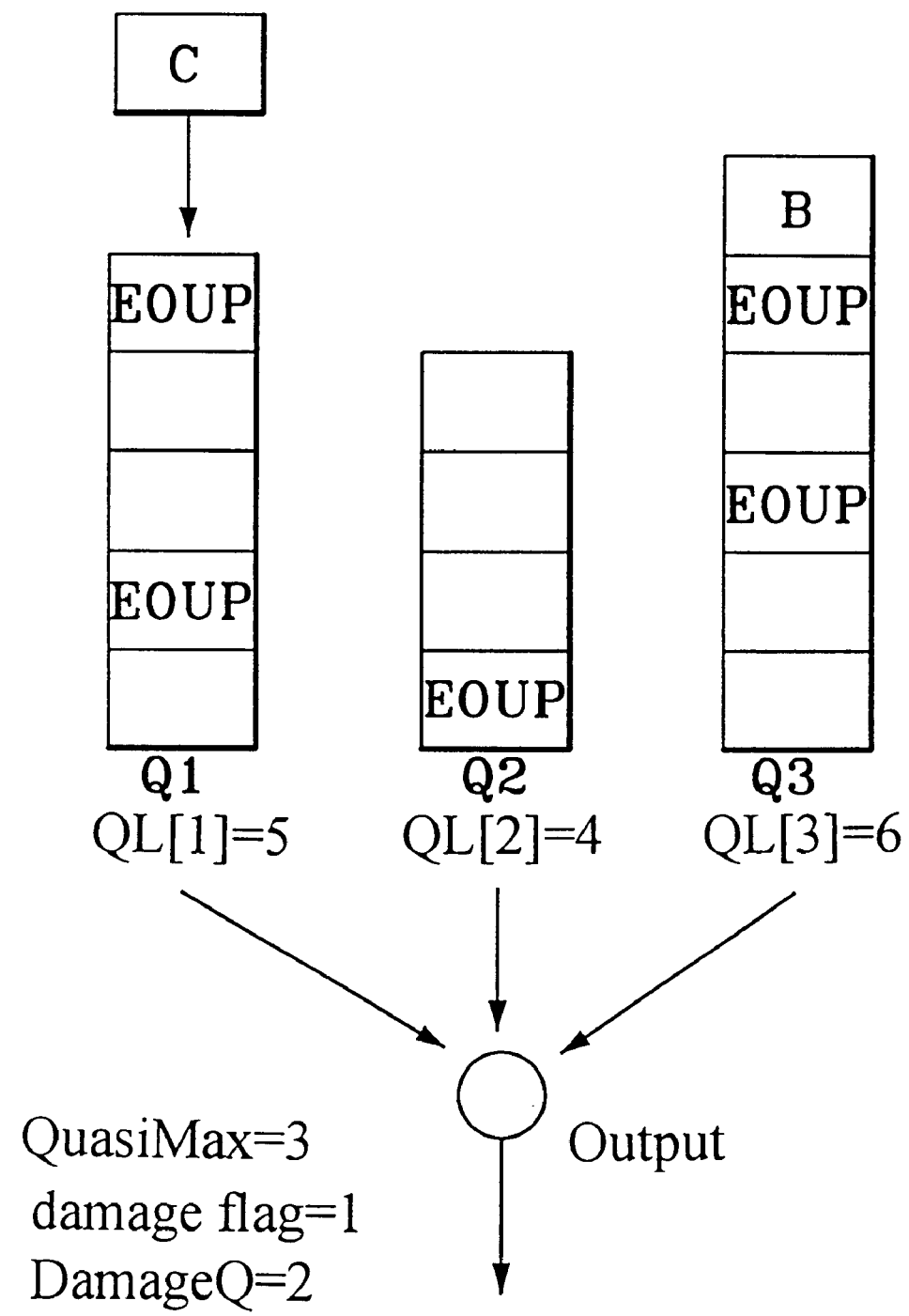

In FIG. 3b, the length of Q1 is unchanged (QL[1]=5), while Q2 has discarded packet A (QL[2]=4), and packet B has entered Q3 (QL[3]=6). Thus, Q3 becomes the quasi-longest queue (QuasiMax=3). Since the upper-layer packet at the head of Q2 has been damaged due to the discarding of packet A, the damage flag is set to "1", and the damaged-queue pointer DamageQ is set to 2.

Figure 3C:
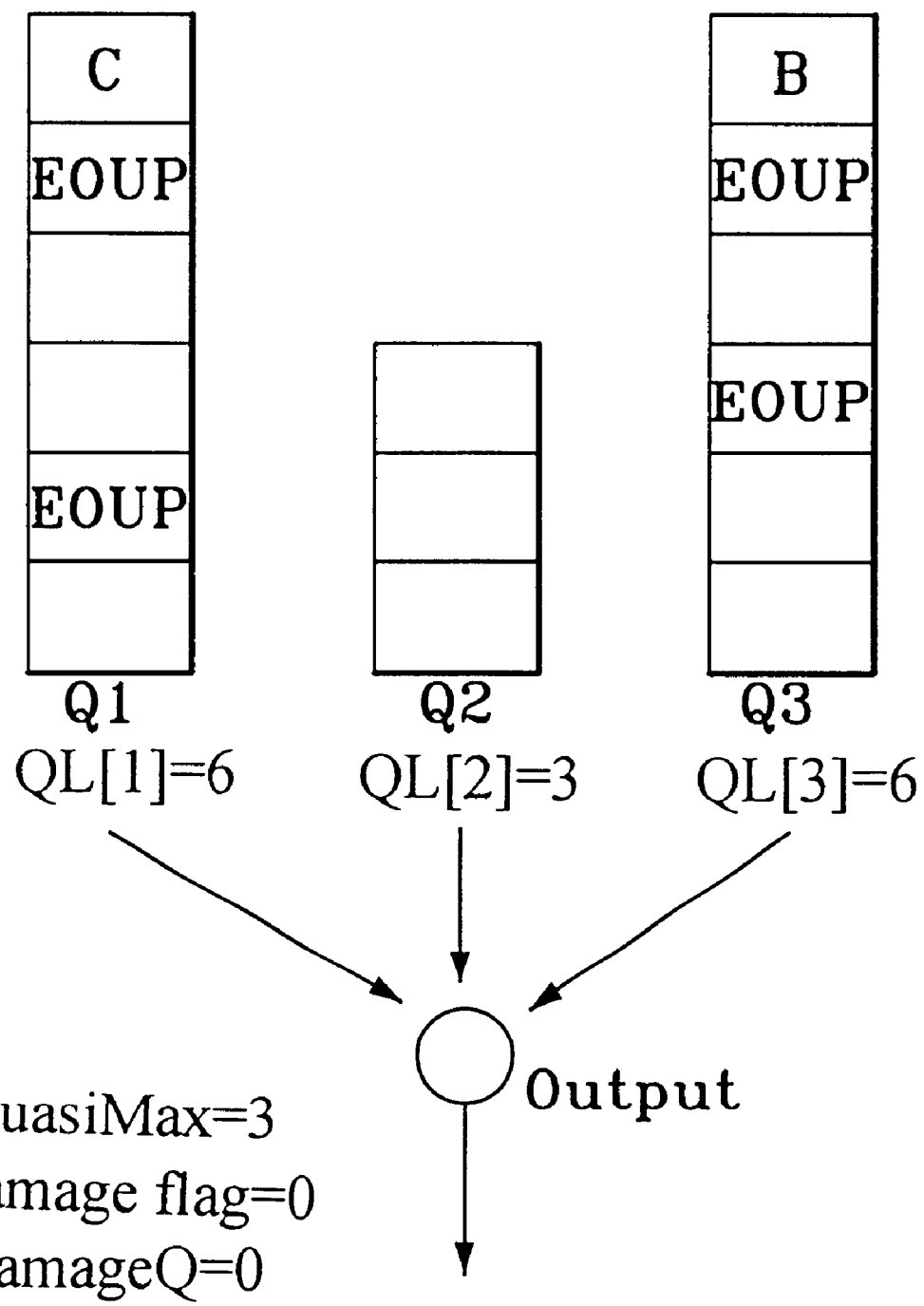

When the packet C enters Q1 and the discarding process is initiated again, the damage flag indicates that Q2 still has one or more packets of a damaged upper-layer packet to be discarded to make space for packet C to Q1. Since the packet discarded from the head of Q2 is the end packet of a upper-layer packet, the contents of damage flag 24 and damaged-queue pointer 26 are reset to "0" as shown in FIG. 3c. And as QL[1] does not grow larger than QL[3], the quasi-longest-queue pointer is still pointed to Q3 (QuasiMax=3).

Above procedure can be illustrated by following steps:

```
for i = 1 to N {
    If (input port i active) {        /*incoming*/
        j=destination [i];
        if (buffer full) {
            if (damaged){        /*discarding from damaged queue*/
                QL[Damage Q] = QL[DamageQ]- 1;
                if (discarding EOUP)
                    damaged=0;
```

```
        }
        else{                    /*discarding from QuasiMax
                                    queue*/
                QL[QuasiMax]=QL[QuasiMax]-1
                if (not discarding EOUP) {
                    DamagedQ=QuasiMax;
                    damaged=1
                }
            }
        }
        QL[j]= QL[j] + 1;        /*buffering input cell*/
        if (QL[QuasiMax]< QL[j])
            QuasiMax=j;          /*input comparison*/
    }
    QL[i] = QL[i] -1;            /*delivering output cell*/
    if (QL[QuasiMax] < QL[i])
        QuasiMax= i;             /*output comparison*/
}
``` wherein, destination [i] means the destination queue of the incoming packet at port i.

In case the upper-layer packet loss performance could not be considered, the present invention can be implemented without the upper-layer packet discarding control. The embodiment of the present invention without the upper-layer packet discarding control is similar to the above-mentioned preferred embodiment with both the damage flag and the damaged-queue pointer being always set to zero.

The present invention employ the quasi-longest-queue pointer to track the real longest queue closely. In the above embodiments, a corresponding input or output comparison is performed to update the quasi-longest-queue pointer on every packet arrival or departure. Comparing to the conventional Pushout packet discarding control, which sorts out the real longest one among all the queues, the number of comparisons as well as the complexity of the system is significantly reduced.

To further reduce the number of comparisons, one of the input and output comparisons can be omitted to become either the input-only quasi-pushout or the output-only quasi-pushout. The former compares only the destination queues and the quasi-longest queue, while the latter compares only the output queues and the quasi-longest queue.

Apparently, fewer comparisons shall result in a longer duration of sub-optimal situation in which the quasi-longest-queue pointer points to a queue other than the real longest one. However, for the output-only quasi-pushout, all queues are served periodically so the sub-optimal duration is upper-bounded. As for the input-only quasi-pushout, hot-spot ports are easily tracked due to their frequent packet arrivals. But, in general, all the quasi-pushout methods of the present invention have about the same packet loss performance as the original Pushout.

The present invention tracks the quasi-longest queue instead of the real longest one for selective pushout packet discarding control, thus greatly reduces the number of queue length comparisons and achieves packet loss performance compatible to the conventional Pushout. In addition, by associating the status of upper-layer packets, the present invention can achieve a better upper-layer packet loss performance by accumulating lower-layer packet losses in damaged upper-layer packets. The features of the invention are illustrated in the embodiments. The purpose of the illustration is to facilitate those skilled in the art to practice the invention, but not to limit the scope of the claims of the present invention. Therefore, any revision or replacement or equivalent modifications based on the technical concept or spirit disclosed by this present invention are within the scope of the claims as disclosed below.

What is claimed is:

1. An input-only quasi-pushout method for selective pushout in a shared-buffer packet communication system, comprising the steps of:
   when a first packet is entering said system for queuing and said shared buffer has been used up, pushing out a second packet from a quasi-longest queue pointed by an quasi-longest queue pointer to release a space;
   entering said first packet to its destination queue by taking the released space;
   updating the length of said destination queue; and
   comparing the length of said destination queue and that of said quasi-longest queue, and if the former is longer, updating said quasi-longest queue pointer to point to said destination queue.

2. An output-only quasi-pushout method for selective pushout in a shared-buffer packet communication system, comprising the steps of:
   when a first packet is entering said system for queuing and said shared buffer has been used up, pushing out a second packet from a quasi-longest queue pointed by an quasi-longest queue pointer to release a space, wherein said quasi-longest queue pointer is updated when a third packet departs from an output queue by comparing the updated length of said output queue and the length of said quasi-longest queue to point to the queue with longer length in said comparison;
   entering said first packet to its destination queue by taking the released space.

3. A quasi-pushout method for selective pushout in a shared-buffer packet communication system, comprising the steps of:
   when a first packet is entering said system for queuing and said shared buffer has been used up, pushing out a second packet from a quasi-longest queue pointed by an quasi-longest queue pointer to release a space;
   entering said first packet to its destination queue by taking the released space;
   updating the length of said destination queue;
   comparing the length of said destination queue and that of said quasi-longest queue, and if the former is longer, updating said quasi-longest queue pointer to point to said destination queue;
   when a third packet departs from an output queue, updating the length of said output queue; and
   comparing the length of said output queue and that of said quasi-longest queue, and if the former is longer, updating said quasi-longest queue pointer to point to said output queue.

4. A packet communication system with shared buffer memory and selective pushout packet discarding control, comprising:
   a packet communication module comprising:
      at least one input port for receiving packets;
      at least one output port for transmitting packets;
      a shared buffer memory having at least one queue for organizing buffered packets; and
      a processor for processing the arrival and departure of packets, comprising a quasi-longest queue pointer pointing to one of said queues as a quasi-longest queue on which said selective pushout discarding is performed, wherein said quasi-longest queue pointer is updated by said processor on every queue length changing events.

5. The system as claimed in claim 4, wherein said queue length changing event takes place in the destination queue of an input packet.

6. The system as claimed in claim 4, wherein said queue length changing event takes place in the output queue of an departing packet.

7. An input-only quasi-pushout method associated with upper-layer packet discarding control, for selective pushout in a shared-buffer packet communication system, comprising the steps of:

when a first packet is entering said system for queuing and said shared buffer has been used up, pushing out a second packet from a queue containing a damage upper-layer packet, and if there is no damaged upper-layer packet, pushing out said second packet from a quasi-longest queue pointed by an quasi-longest queue pointer, to release a space;

entering said first packet to its destination queue by taking the released space;

updating the length of said destination queue; and comparing the length of said destination queue and that of said quasi-longest queue, and if the former is longer, updating said quasi-longest queue pointer to point to said destination queue.

8. The input-only quasi-pushout method as claimed in claim 7, wherein said queue containing a damaged upper-layer packet is indicated by a damaged-queue pointer, and a damage flag is used to indicate the presence of a damaged upper-layer packet.

9. An output-only quasi-pushout method associated with upper-layer packet discarding control, for selective pushout in a shared-buffer packet communication system, comprising the steps of:

when a first packet is entering said system for queuing and said shared buffer has been used up, pushing out a second packet from a queue containing a damaged upper-layer packet, and if there is no damaged upper-layer packet, pushing out said second packet from a quasi-longest queue pointed by an quasi-longest queue pointer, to release a space, wherein said quasi-longest queue pointer is updated when a third packet departs from an output queue by comparing the updated length of said output queue and the length of said quasi-longest queue to point to the queue with longer length in said comparison;

entering said first packet to its destination queue by taking the released space.

10. The output-only quasi-pushout method as claimed in claim 9, wherein said queue containing a damaged upper-layer packet is indicated by a damaged-queue pointer and a damage flag is used to indicate the presence of a damaged upper-layer packet.

11. A quasi-pushout method associated with upper-layer packet discarding control, for selective pushout in a shared-buffer packet communication system comprising the steps of:

when a first packet is entering said system for queuing and said shared buffer has been used up, pushing out a second packet from a queue containing a damaged upper-layer packet, and if there is no damaged upper-layer packet, pushing out said second packet from a quasi-longest queue pointed by an quasi-longest queue pointer, to release a space;

entering said first packet to its destination queue by taking the released space;

updating the length of said destination queue;

comparing the length of said destination queue and that of said quasi-longest queue, and if the former is longer, updating said quasi-longest queue pointer to point to said destination queue;

when a third packet departs from an output queue, updating the length of said output queue; and comparing the length of said output queue and that of said quasi-longest queue, and if the former is longer, updating said quasi-longest queue pointer to point to said output queue.

12. The quasi-pushout method as claimed in claim 11, wherein said queue containing a damaged upper-layer packet is indicated by a damaged-queue pointer and a damage flag is used to indicate the presence of a damaged upper-layer packet.

13. A packet communication system with shared buffer memory and selective pushout packet discarding control, comprising:

a packet communication module comprising:
   at least one input port for receiving packets;
   at least one output port for transmitting packets;
   a shared buffer memory having at least one queue for organizing buffered packets; and
   a processor for processing the arrival and departure of packets, comprising:
      a damage flag and a damaged-queue pointer indicating the presence of a damaged upper-layer packet and the queue storing said damaged upper-layer packet respectively; and
      a quasi-longest queue pointer pointing to one of said queues as a quasi-longest queue on which said selective pushout discarding is performed if no damaged upper-layer packet exists, wherein said quasi-longest queue pointer is updated by said processor on every queue length changing events.

14. The system as claimed in claim 13, wherein said queue length changing event takes place in the destination queue of an input packet.

15. The system as claimed in claim 13, wherein said queue length changing event takes place in the output queue of an departing packet.

* * * * *